United States Patent
Nagai et al.

(10) Patent No.: US 8,962,503 B2
(45) Date of Patent: Feb. 24, 2015

(54) COLORED GLASS PLATE

(75) Inventors: Kensuke Nagai, Tokyo (JP); Yuichi Suzuki, Tokyo (JP); Terutaka Maehara, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 161 days.

(21) Appl. No.: 13/547,529

(22) Filed: Jul. 12, 2012

(65) Prior Publication Data

US 2012/0289394 A1  Nov. 15, 2012

Related U.S. Application Data

(63) Continuation of application No. PCT/JP2011/051343, filed on Jan. 25, 2011.

(30) Foreign Application Priority Data

Jan. 26, 2010  (JP) ................................ 2010-014254

(51) Int. Cl.
  *C03C 3/087* (2006.01)
  *C03C 4/02* (2006.01)

(52) U.S. Cl.
  CPC .. *C03C 3/087* (2013.01); *C03C 4/02* (2013.01)
  USPC ............................................. 501/70; 501/71

(58) Field of Classification Search
  CPC ...................................................... C03C 3/087
  USPC .................................................... 501/70, 71
  See application file for complete search history.

(56) References Cited

U.S. PATENT DOCUMENTS

| | | | |
|---|---|---|---|
| 5,069,826 A * | 12/1991 | Cheng | 252/587 |
| 6,673,730 B1 | 1/2004 | Shelestak | |
| 6,927,186 B2 * | 8/2005 | Hulme et al. | 501/70 |
| 7,591,763 B1 * | 9/2009 | Fucci | 482/52 |
| 7,598,190 B2 | 10/2009 | Taguchi et al. | |
| 7,659,221 B2 * | 2/2010 | Arbab et al. | 501/70 |
| 2003/0008759 A1 * | 1/2003 | Costin et al. | 501/32 |
| 2006/0211563 A1 * | 9/2006 | Arbab et al. | 501/70 |

FOREIGN PATENT DOCUMENTS

| | | |
|---|---|---|
| JP | 2002-348143 | 12/2002 |
| JP | 2005-132709 | 5/2005 |
| JP | 2006-265001 | 10/2006 |
| WO | WO 2007/125713 | 11/2007 |

OTHER PUBLICATIONS

Machine Translation JP 2006-265001 May 10, 2006.*
International Search Report issued Mar. 8, 2011 in PCT/JP2011/051343 filed Jan. 25, 2011.

* cited by examiner

*Primary Examiner* — Anthony J Green
*Assistant Examiner* — Elizabeth A Bolden
(74) *Attorney, Agent, or Firm* — Oblon, Spivak, McClelland, Maier & Neustadt, L.L.P.

(57) ABSTRACT

To provide a colored glass plate, which uses sodium sulfate ($Na_2SO_3$) as a refining agent and which is capable of stably maintaining the mass percentage of divalent iron calculated as $Fe_2O_3$ in the total iron calculated as $Fe_2O_3$ at a high level, while suppressing development of an amber color that is derived from sodium sulfate. A colored glass plate made of alkali-containing silica glass containing elements of iron, tin and sulfur, wherein the percentage of the total sulfur calculated as $SO_3$ is at least 0.025% as represented by mass percentage based on oxides, the percentage of divalent iron calculated as $Fe_2O_3$ in the total iron calculated as $Fe_2O_3$ is from 60 to 80% as represented by mass percentage, and the percentage of divalent tin calculated as $SnO_2$ in the total tin calculated as $SnO_2$ is at least 0.1% as represented by mol percentage.

8 Claims, No Drawings

COLORED GLASS PLATE

This application is a continuation of PCT/JP11/051343 filed Jan. 25, 2011, and claims priority to Japanese application 2010-014254 filed Jan. 26, 2010.

TECHNICAL FIELD

The present invention relates to a colored glass plate whereby transmitted light has a blue or green color.

BACKGROUND ART

As a colored glass plate, a heat absorbing glass for automobiles is, for example, known which is made of alkali-containing silica glass and whereby transmitted light has a blue or green color as it contains iron as a coloring component (Patent Documents 1 to 3). The iron in the glass is present in the form of a divalent or trivalent iron. The divalent iron has an absorption peak at a wavelength in the vicinity of 1,100 nm, and the trivalent iron has an absorption peak at a wavelength in the vicinity of 400 nm. Therefore, in a case where attention is paid to the blue or green color of transmitted light, it is preferred to increase the mass percentage of divalent iron calculated as $Fe_2O_3$ in the total iron calculated as $Fe_2O_3$ (hereinafter referred to as Fe-Redox).

Further, a colored glass plate made of alkali-containing silica glass usually contains sulfur derived from sodium sulfate ($Na_2SO_4$) contained as a refining agent in glass raw material.

In a case where sodium sulfate ($Na_2SO_4$) is used, as the amount incorporated increases, the refining effect becomes high, and it becomes easy to remove bubbles during glass melting. However, sulfur derived from sodium sulfate is present in the form of minus divalent or hexavalent sulfur in glass, whereby the minus divalent sulfur has an amber color having an absorption peak at a wavelength in the vicinity of 380 nm, and the hexavalent sulfur is colorless. Therefore, in order to obtain a colored glass plate whereby transmitted light has the desired color, it is preferred to suppress formation of the minus divalent sulfur (amber color development) as far as possible.

Whereas, in order to increase Fe-Redox, it is necessary to add a reducing agent (coke or the like) in a large amount to the glass material. However, at the time of reducing the trivalent iron to the divalent iron by the reducing agent, the hexavalent sulfur is also reduced to minus divalent sulfur by the reducing agent, whereby the amber color development becomes distinct. Therefore, it is difficult to bring Fe-Redox to be at least 60% while suppressing the amber color development.

PRIOR ART DOCUMENTS

Patent Documents

Patent Document 1: JP-A-2002-348143
Patent Document 2: U.S. Pat. No. 6,673,730
Patent Document 3: WO2007/125713

DISCLOSURE OF INVENTION

Technical Problem

It is an object of the present invention to provide a colored glass plate, which uses sodium sulfate ($Na_2SO_4$) as a refining agent and which is capable of stably maintaining Fe-Redox at a high level, while suppressing development of an amber color derived from sodium sulfate.

Solution to Problem

The colored glass plate of the present invention is made of alkali-containing silica glass containing elements of iron, tin and sulfur, wherein the percentage of the total sulfur calculated as $SO_3$ is at least 0.025% as represented by mass percentage based on oxides, the percentage of divalent iron calculated as $Fe_2O_3$ in the total iron calculated as $Fe_2O_3$ is from 60 to 80% as represented by mass percentage, and the percentage of divalent tin calculated as $SnO_2$ in the total tin calculated as $SnO_2$ is at least 0.1% as represented by mol percentage.

The colored glass plate of the present invention is made of alkali-containing silica glass containing elements of iron, tin and sulfur, wherein the percentage of the total sulfur calculated as $SO_3$ is at least 0.025% as represented by mass percentage based on oxides, the Fe-Redox value is from 60 to 80%, and the Sn-Redox value is at least 0.1%.

Further, the colored glass plate of the present invention preferably has an absorption coefficient of at most 1.00 $cm^{-1}$ at a wavelength of 380 nm.

Further, in the colored glass plate of the present invention, it is preferred that the percentage of divalent tin calculated as $SnO_2$ in the total tin calculated as $SnO_2$ is at least 3% and at most 40% as represented by mol percentage.

Further, in the colored glass plate of the present invention, it is preferred that the Sn-Redox value is at least 3% and at most 40%.

Further, the colored glass plate of the present invention preferably comprises, as represented by mass percentage based on the following oxides:

$SiO_2$: from 30 to 80%,
$Al_2O_3$: from 0 to 30%,
$B_2O_3$: from 0 to 20%,
MgO: from 0 to 30%,
CaO: from 0 to 30%,
$Na_2O$: from 0.5 to 50%,
$K_2O$: From 0 to 50%,
Total iron calculated as $Fe_2O_3$: from 0.001 to 5%,
Total tin calculated as $SnO_2$: from 0.001 to 5%.

Further, the colored glass plate of the present invention may contain, as represented by mass percentage based on the following oxide:

Total sulfur calculated as $SO_3$: from 0.025 to 0.5%, more preferably from 0.055 to 0.065%.

In this specification, " to " is used to include numerical values presented before and after "to" as the lower limit value and the upper limit value, unless otherwise specified.

Advantageous Effects of Invention

The colored glass plate of the present invention uses sodium sulfate ($Na_2SO_4$) as a refining agent and is capable of stably maintaining Fe-Redox at a high level while suppressing development of an amber color derived from sodium sulfate. Therefore, it becomes a colored glass plate whereby transmitted light has a blue or green color.

DESCRIPTION OF EMBODIMENTS

The colored glass plate of the present invention is characterized in that sodium sulfate ($Na_2SO_4$) is used as a refining agent, and to alkali-containing silica glass (such as soda lime silica glass) containing elements of iron and sulfur, tin is further incorporated and the percentage (mol percentage) of divalent tin in the total tin (hereinafter referred to as Sn-Redox) is made to be at least a specific percentage, thereby to stably maintain Fe-Redox at a high level, while suppressing development of an amber color derived from sodium sulfate.

Iron in the glass is present in the form of divalent or trivalent iron. The divalent iron has an absorption peak at a wavelength in the vicinity of 1,100 nm, and the trivalent iron has an absorption peak at a wavelength in the vicinity of 400 nm. Therefore, when attention is paid to a blue or green color of transmitted light, it is better that no absorption is observed at a wavelength in the vicinity of 400 nm, and in terms of Fe-Redox, it is necessary to increase Fe-Redox. That is, it is necessary to increase the percentage of divalent iron calculated as $Fe_2O_3$ in the total iron calculated as $Fe_2O_3$.

Further, as the divalent iron has an absorption peak at a wavelength in the vicinity of 1,100 nm, the transmittance of heat (hereinafter referred to as Te) passing through the colored glass plate tends to be small. Also from the viewpoint of Te, it is preferred to increase Fe-Redox. From such a viewpoint, the Fe-Redox value is preferably from 60 to 80%, or when the proportion of divalent iron calculated as $Fe_2O_3$ in the total iron calculated as $Fe_2O_3$ is represented by mass percentage, it is preferably from 60 to 80%. Here, in the present specification, the Fe-Redox value is deemed to be a synonym for the mass percentage representation of the percentage of the divalent iron calculated as $Fe_2O_3$ in the total iron calculated as $Fe_2O_3$, and in the following description, they may be represented mainly as Fe-Redox.

In the colored glass plate of the present invention, the above Te value is preferably at most 58%, more preferably at most 50%. Here, the above Te is a value measured with respect to the colored glass plate having a thickness of 4 mm and is a so-called a value calculated as a glass plate having a thickness of 4 mm.

In the colored glass plate of the present invention, Fe-Redox is from 60 to 80%. When Fe-Redox is at least 60%, the color of transmitted light becomes the desired blue or green color. When Fe-Redox is at most 80%, reduction of hexavalent sulfur is prevented, whereby it is possible to prevent development of an amber color due to formation of minus divalent sulfur. Fe-Redox is preferably from 60 to 75%, more preferably from 60 to 70%. In order to increase Fe-Redox, the installation and production costs tend to increase, and therefore, Fe-Redox should better be low.

Tin in the glass is present in the form of divalent or tetravalent tin. The divalent tin serves as a reducing agent for iron under such a condition that Fe-Redox is low (e.g. less than 60%), and the tetravalent tin serves as an oxidizing agent for iron under such a condition that Fe-Redox is high (e.g. more than 80%). Further, reduction of tin by a reducing agent such as coke takes place more preferentially than reduction of sulfur, whereby formation of minus divalent sulfur can be suppressed even under such a condition that Fe-Redox is at least 60%. Thus, tin serves as a buffering agent for a redox reaction of iron or sulfur. Therefore, in order to stably maintain Fe-Redox at a high level while suppressing development of an amber color, it is preferred to increase Sn-Redox i.e. to increase the percentage of divalent tin calculated as $SnO_2$ in the total tin calculated as $SnO_2$. Here, in this specification, the Sn-Redox value is deemed to be a synonym for the mass percentage representation of the percentage of divalent tin calculated as $SnO_2$ in the total tin calculated as $SnO_2$, and in the following description, they will be represented mainly as Sn-Redox. Further, for Sn, the abundance ratio of ions is measured, and therefore, a mol percentage was employed as the unit. For Fe-Redox, a "mass percentage" which has been commonly used, was employed.

In the colored glass plate of the present invention, Sn-Redox is at least 0.1%, preferably from 0.1 to 50%. When Sn-Redox is at least 0.1%, it is possible to stably maintain Fe-Redox at a high level while suppressing development of an amber color. When Sn-Redox is at most 50%, reduction of hexavalent sulfur by excessive divalent tin can be prevented, and it is possible to prevent development of an amber color due to formation of minus divalent sulfur. Sn-Redox is more preferably from 3 to 40%.

The colored glass plate of the present invention is preferably made of alkali-containing silica glass having the following composition.

It comprises, as represented by mass percentage based on the following oxides:
$SiO_2$: from 30 to 80%,
$Al_2O_3$: from 0 to 30%,
$B_2O_3$: from 0 to 20%,
MgO: from 0 to 30%,
CaO: from 0.1 to 30%,
$Na_2O$: from 0.5 to 50%,
$K_2O$: From 0 to 50%,
Total iron calculated as $Fe_2O_3$: from 0.001 to 5%,
Total tin calculated as $SnO_2$: from 0.001 to 5%,
Total sulfur calculated as $SO_3$: at least 0.025%.

When the content of $SiO_2$ is at least 30%, the weather resistance will be good. When the content of $SiO_2$ is at most 80%, devitrification tends to be less likely to occur. The content of $SiO_2$ is preferably from 50 to 80%, more preferably from 50 to 75%, as represented by mass percentage based on oxides.

$Al_2O_3$ is a component to improve the weather resistance.
When the content of $Al_2O_3$ is at most 30%, the melting property will be good. The content of $Al_2O_3$ is preferably from 0 to 15% as represented by mass percentage based on oxides.

$B_2O_3$ is a component to promote melting of glass raw material.
When the content of $B_2O_3$ is at most 20%, the softening point hardly tends to be low. The content of $B_2O_3$ is preferably from 0 to 10%, more preferably from 0 to 5%, as represented by mass percentage based on oxides.

MgO is a component to promote melting of glass raw material and to improve weather resistance.
When the content of MgO is at most 30%, devitrification tends to be less likely to occur. The content of MgO is preferably from 0 to 20%, more preferably from 0 to 15%, as represented by mass percentage based on oxides.

CaO is a component to promote melting of glass raw material and to improve weather resistance.
When the content of CaO is at least 0.1%, the melting property and weather resistance will be good. When the content of CaO is at most 30%, devitrification tends to be less likely to occur. The content of CaO is preferably from 0.1 to 20%, more preferably from 0.5 to 15%, further preferably from 1 to 10%, as represented by mass percentage based on oxides.

$Na_2O$ is a component to promote melting of glass raw material.
When the content of $Na_2O$ is at least 0.5%, the melting property will be good. When the content of $Na_2O$ is at most 50%, the weather resistance will be good. The content of $Na_2O$ is preferably from 1 to 30%, more preferably from 1 to 25%, further preferably from 1 to 20%, as represented by mass percentage based on oxides.

$K_2O$ is a component to promote melting of glass raw material.

When the content of $K_2O$ is at most 50%, the weather resistance will be good. The content of $K_2O$ is preferably from 0 to 20%, more preferably from 0 to 15%, as represented by mass percentage based on oxides.

$Fe_2O_3$ is a coloring component.

When the content of the total iron calculated as $Fe_2O_3$ is at least 0.001%, the glass plate will be one whereby transmitted light has a sufficiently blue or green color. When the content of the total iron calculated as $Fe_2O_3$ is at most 5%, the visible light transmittance of glass will be good. The content of the total iron calculated as $Fe_2O_3$ is preferably from 0.005 to 4%, more preferably from 0.01 to 3%, as represented by mass percentage based on oxides.

In this specification, the content of the total iron is represented as the amount of $Fe_2O_3$ in accordance with a standard analytical method, but as mentioned above, all of iron present in the glass may not be present in the form of trivalent iron ($Fe_2O_3$), and divalent iron (FeO) is also present. The percentage of such divalent iron (FeO) is represented by the above-mentioned Fe-Redox.

$SnO_2$ is a component which serves as a buffering agent for a redox reaction of iron or sulfur.

When the content of the total tin calculated as $SnO_2$ is at least 0.001%, the effect as a buffering agent can sufficiently be obtained. When the content of the total tin calculated as $SnO_2$ is at most 5%, vaporization of $SnO_2$ is little, whereby the cost can be suppressed to be low. The content of the total tin calculated as $SnO_2$ is preferably from 0.002 to 4%, more preferably from 0.005 to 3%, as represented by mass percentage based on oxides.

In this specification, the content of the total tin is represented as the amount of $SnO_2$ in accordance with a standard analytical method, but as mentioned above, all of tin present in the glass may not be present in the form of tetravalent tin ($SnO_2$), and divalent tin (SnO) is also present. The percentage of such divalent tin (SnO) is represented by the above-mentioned Sn-Redox.

The colored glass plate of the present invention may contain SrO, BaO or $ZrO_2$, as the case requires. SrO or BaO is a component to promote melting of glass raw material. $ZrO_2$ is a component to improve the elastic modulus (Young's modulus) of the glass.

For the purpose of adjusting the color of transmitted light, the colored glass plate of the present invention may contain other coloring components (such as $TiO_2$, $CeO_2$, $V_2O_5$, CuO, CoO, $Cr_2O_3$, NiO, Se oxide, MnO, etc.), as the case requires. Particularly, $TiO_2$ is a component to impart a yellow color to transmitted light, and by combining it with divalent iron to impart a blue color to transmitted light, the transmitted light will have a green color.

The colored glass plate of the present invention contains $SO_3$ derived from sodium sulfate ($Na_2SO_4$) which is usually contained as a refining agent in glass raw material.

The content of the total sulfur calculated as $SO_3$ is preferably from 0.025 to 0.5% as represented by mass percentage based on oxides. When the content of the total sulfur calculated as $SO_3$ is at most 0.5%, the gas component of $SO_2$ will not remain in glass as bubbles. Further, development of an amber color can be suppressed. On the other hand, if it is less than 0.025%, although development of an amber color derived from sodium sulfate becomes not distinct, the refining effect during the glass melting tends to be poor, bubbles are likely to remain, or a separate operation is required to remove bubbles, thus leading to an increase of the production cost. The content of the total sulfur calculated as $SO_3$ is more preferably from 0.025 to 0.3%, further preferably from 0.050 to 0.070%, particularly preferably from 0.055 to 0.065%.

In this specification, the content of the total sulfur is represented as an amount of $SO_3$ in accordance with a standard analytical method, but as mentioned above, all of sulfur present in the glass may not be present in the form of hexavalent sulfur, and minus divalent sulfur is also present.

The colored glass plate of the present invention may contain $Sb_2O_3$ or $As_2O_3$ to be used as another refining agent, as the case requires.

Of the colored glass plate of the present invention, the absorption coefficient at a wavelength of 380 nm being a peak wavelength of the amber color emission, is at most $1.00\ cm^{-1}$, preferably at most $0.70\ cm^{-1}$, more preferably at most $0.50\ cm^{-1}$. Here, the absorption coefficient at a wavelength of 380 nm is a value measured with respect to the colored glass plate having a thickness of 4 mm and is so-called a value calculated as a glass plate having a thickness of 4 mm.

The colored glass plate of the present invention may be used for vehicles or buildings and is particularly suitable as a windshield for automobiles. In a case where it is used as a window glass for automobiles, it may be used, as the case requires, in the form of laminated glass having a plurality of glass plates sandwiched with interlayers, glass having a flat glass processed to have a curved surface, or glass having tempering treatment applied. On the other hand, in a case where it is used as insulating glass units for buildings, it may be used in the form of a double layered glass comprising two colored glass plates of the present invention, or a double layered glass comprising a colored glass plate of the present invention and another glass plate.

The colored glass plate of the present invention can be produced by a known forming method such as a float process or a fusion process (a down draw process).

The colored glass plate of the present invention is produced, for example, via the following sequential steps (i) to (v).

(i) To obtain the desired composition, the glass matrix composition material such as silica sand, a coloring component material such as an iron source, a titanium source, etc., a reducing agent, a refining agent, etc. are mixed to prepare glass raw material.

(ii) The glass raw material is continuously supplied to a melting kiln and heated and melted at about 1,500° C. by e.g. heavy oil, natural gas or the like, to obtain molten glass.

(iii) The molten glass is refined and then formed into a glass plate having a prescribed thickness by e.g. a float process.

(iv) After annealing, the glass plate is cut into a prescribed size to obtain a colored glass plate of the present invention.

(v) As the case requires, the cut glass plate may be subjected to tempering treatment, or may be processed into laminated glass or insulating glass units.

The glass matrix composition material may be one which is commonly used as raw material for usual alkali-containing silica glass (such as soda lime silica glass), such as silica sand, alkali components, alkaline earth components, etc.

The iron source may, for example, be iron powder, iron oxide powder or red oxide.

The titanium source to be added as a coloring component, as the case requires, may, for example, be titanium oxide.

The reducing agent may, for example, be coke. The reducing agent is one to prevent oxidation of iron in the molten glass and to adjust Fe-Redox to the desired level.

In addition, $SnO_2$ is used as a reducing agent or a refining agent, and sodium sulfate ($Na_2SO_4$) is used as a refining agent.

As described above, the colored glass plate of the present invention contains tin, and Sn-Redox is at least 0.1%, preferably from 0.1% to 50%, whereby the tin serves as a buffering agent for a redox reaction of iron or sulfur. Therefore, it is possible to stably maintain Fe-Redox at a high level, while preventing formation of an amber color due to divalent sulfur. As a result, a colored glass plate is obtainable whereby transmitted light has the desired blue or green color.

EXAMPLES

Now, the present invention will be described in detail with reference to Examples, but it should be understood that the present invention is by no means limited to such Examples.

Examples 1, 3 and 4 are Working Examples of the present invention, and Examples 2 and 5 to 8 are Comparative Examples.

(Fe-Redox)

With respect to an obtained glass plate, Fe-Redox was calculated by means of the following formula (1) from the spectrum curve of the glass plate measured by a spectrophotometer.

$$\text{Fe-Redox}(\%) = -\log e(T_{1000\,nm}/91.4)/(Fe_2O_3 \text{ amount} \times t \times 20.79) \times 100 \quad (1)$$

wherein $T_{1000\,nm}$ is the transmittance (%) at a wavelength of 1,000 nm measured by a spectrophotometer (Lambda 950, manufactured by Perkin Elmer), "t" is the thickness (cm) of the glass plate, and $Fe_2O_3$ amount is the content (%=mass percentage) of the total iron calculated as $Fe_2O_3$, obtained by the fluorescent X-ray measurement.

The above Fe-Redox is one obtained from the spectrum curve of the glass plate measured by a spectrophotometer, but this value may be deemed to be equal to the mass percentage of divalent iron calculated as $Fe_2O_3$ in the total iron calculated as $Fe_2O_3$ in the same glass.

(Sn-Redox)

With respect to an obtained glass plate, the contents of divalent tin and tetravalent tin in the glass were measured at room temperature by the following Sn-Mossbauer spectroscopy, and Sn-Redox was calculated.

(Sn-Mossbauer Spectroscopy)

Using γ-ray (23.8 keV) generated by the energy transition from $^{119\,m}Sn$ to $^{119}Sn$ as a probe, the abundance ratio of divalent tin and tetravalent tin in the sample (Sn-Redox) was measured. Specifically, the measurement was as follows.

A γ-ray exit of a radiation source, the glass sample, a Pd filter and a light receiving section of a gas amplification proportional counter (Model No. 45431, manufactured by LND) were aligned in a straight line of a length of from 300 to 800 mm.

As the radiation source, $^{119\,m}Sn$ of 10 mCi was used, and the radiation source was vibrated in the axial direction of the optical system to induce an energy change of γ-ray due to Doppler effect. The speed of the radiation source was adjusted so that it was vibrated at a speed of from −10 to +10 mm/sec. in the axial direction of the optical system by using a transducer (manufactured by Toyo Research).

As the glass sample, one having an obtained glass plate polished to a thickness of from 3 to 7 mm was used.

The Pd filter is one to improve the precision in counting γ-ray by the gas amplification proportional counter and is a Pd foil having a thickness of 50 μm to remove characteristic X-rays generated from the glass sample at the time when the glass sample is irradiated with γ-ray.

Gas amplification proportional counter is one to detect received γ-ray. An electric signal showing the amount of γ-ray from the gas amplification proportional counter was amplified by an amplification apparatus (manufactured by Kansai Electronics Co., Ltd.), and the received signal was detected. By means of a multichannel analyzer (CMCA550 manufactured by Wissel), the detected signal was related to the above speed information.

A spectrum is obtained by plotting the detected signal from the gas amplification proportional counter on the ordinate and the speed of the vibrating radiation source on the abscissa ("Fundamental and Application of Mossbauer spectroscopy", edited by Hirotoshi Sato and Motomi Katada, published by Gakkai Shuppan, p. 45-64). An accumulated time of from 2 days to 16 days was required until a signal/noise ratio which could be evaluated, was obtained.

A peak appearing in the vicinity of 0 mm/sec. represents the presence of tetravalent tin, and two divided peaks appearing in the vicinity of 2.5 mm/sec. and 4.5 mm/sec. represent the presence of divalent tin. A ratio of ones obtained by multiplying the respective peak areas by correction coefficients (Darja Benner et al, "The effect of alumina on the $Sn^{2+}/Sn^{4+}$ redox equilibrium and the incorporation of tin in $Na_2O/Al_2O_3/SiO_2$ melts", Journal of Non-Crystalline Solids, 337, 2004, p. 232-240) (tetravalent tin: 0.22, divalent tin: 0.49), was calculated, to obtain Sn-Redox.

The above Sn-Redox is one obtained from the spectrum curve of the glass plate measured by spectroscopy, but this value may be deemed to be equal to the mass percentage of divalent Sn calculated as $SnO_2$ in the total tin calculated as $SnO_2$ in the same glass.

(Absorption Coefficient at a Wavelength of 380 nm)

With respect to a glass plate having a thickness of 4 mm, transmittance was measured every 1 nm by means of a spectrophotometer (Lambda 950, manufactured by Perkin Elmer) to obtain the absorption coefficient at 380 nm per 1 cm. (Tva)

With respect to an obtained glass plate, a visible light transmittance (Tv) prescribed in JIS R3106 (by A light source) was obtained as a value calculated as a thickness of 4 mm.

(Te)

With respect to an obtained glass plate, a solar transmittance (Te) prescribed in JIS R3106 was obtained as a value calculated as a thickness of 4 mm.

Examples 1 to 8

Various glass matrix composition materials such as silica sand, etc., coke, an iron source, $SnO_2$ and sodium sulfate ($Na_2SO_4$) were mixed to have the composition shown in Table 1 or 2 to prepare glass raw material. The glass raw material was put into a crucible and heated at 1,480° C. for 3 hours to obtain molten glass. The molten glass was cast on a carbon plate and cooled. Both sides were polished to obtain a glass plate having a thickness of 4 mm. With respect to the glass plate, Fe-Redox, Sn-Redox, and the absorption coefficient at a wavelength of 380 nm, were obtained. The results are shown in Table 1 or 2.

TABLE 1

|  |  | Ex. 1 | Ex. 2 | Ex. 3 | Ex. 4 |
|---|---|---|---|---|---|
| Amount of coke charged [%] | | 0.036 | 0.021 | 0.051 | 0.065 |
| Composition [%] | $SiO_2$ | 72.3 | 72.3 | 72.3 | 72.3 |
| | $Al_2O_3$ | 1.3 | 1.3 | 1.3 | 1.3 |
| | MgO | 4.7 | 4.7 | 4.7 | 4.7 |

TABLE 1-continued

|  |  | Ex. 1 | Ex. 2 | Ex. 3 | Ex. 4 |
|---|---|---|---|---|---|
|  | CaO | 8.3 | 8.3 | 8.3 | 8.3 |
|  | $Na_2O$ | 12.5 | 12.5 | 12.5 | 12.5 |
|  | $K_2O$ | 0.6 | 0.6 | 0.6 | 0.6 |
|  | $Fe_2O_3$ | 0.25 | 0.22 | 0.25 | 0.24 |
|  | $SnO_2$ | 0.23 | 0.23 | 0.23 | 0.23 |
|  | $SO_3$ | 0.061 | 0.022 | 0.062 | 0.057 |
| Fe-Redox [%] |  | 61.0 | 70.6 | 72.7 | 77.9 |
| Sn-Redox [%] |  | 3.7 | 0.1 | 9.8 | 35.2 |
| Absorption coefficient at 380 nm [$cm^{-1}$] |  | 0.21 | 0.23 | 0.25 | 0.44 |
| Tva [%] |  | 81 | 79 | 79 | 76 |
| Te [%] |  | 56 | 51 | 51 | 47 |

TABLE 2

|  |  | Ex. 5 | Ex. 6 | Ex. 7 | Ex. 8 |
|---|---|---|---|---|---|
| Amount of coke charged [%] |  | 0.036 | 0.021 | 0.051 | 0.065 |
| Composition [%] | $SiO_2$ | 72.3 | 72.3 | 72.3 | 72.3 |
|  | $Al_2O_3$ | 1.3 | 1.3 | 1.3 | 1.3 |
|  | MgO | 4.7 | 4.7 | 4.7 | 4.7 |
|  | CaO | 8.3 | 8.3 | 8.3 | 8.3 |
|  | $Na_2O$ | 12.5 | 12.5 | 12.5 | 12.5 |
|  | $K_2O$ | 0.6 | 0.6 | 0.6 | 0.6 |
|  | $Fe_2O_3$ | 0.22 | 0.23 | 0.23 | 0.22 |
|  | $SnO_2$ | 0.00 | 0.00 | 0.00 | 0.00 |
|  | $SO_3$ | 0.016 | 0.020 | 0.014 | 0.012 |
| Fe-Redox [%] |  | 51.5 | 41.0 | 57.0 | 66.8 |
| Sn-Redox [%] |  | — | — | — | — |
| Absorption coefficient at 380 nm [$cm^{-1}$] |  | 0.26 | 0.26 | 0.69 | 1.79 |
| Tva [%] |  | 84 | 82 | 75 | 64 |
| Te [%] |  | 62 | 58 | 50 | 40 |

In the Tables, Examples 1, 3 and 4 are Working Examples of the present invention, and Examples 2 and 5 to 8 are Comparative Examples.

Coke as a reducing agent is represented by the charged amount based on the total amount of the entire glass raw material, and other components of the composition are components in the glass. Both are represented by mass percentage (%).

In the colored glass plates of the present invention in Examples 1, 3 and 4, Sn-Redox was more than 0.1%, whereby Fe-Redox was maintained at a high level, and development of an amber color was prevented. In Example 2, although development of an amber color was prevented, the remaining amount of $SO_3$ was small. Under such a condition, bubbles are likely to remain in the practical production.

The glass plates in Examples 5 and 6 did not contain tin, and it was necessary to bring Fe-Redox to be less than 60% in order to prevent development of an amber color. For this reason, the absorption in a infrared region of divalent iron decreased, and Te increased. In Examples 7 and 8, development of an amber color occurred, although Fe-Redox was high.

The glass plate in Example 8 did not contain tin, whereby development of an amber color became distinct, when Fe-Redox was made to be at least 60%.

INDUSTRIAL APPLICABILITY

The colored glass plate of the present invention is useful as a glass plate for vehicles or buildings, and particularly suitable as a heat-absorbing glass plate for automobiles.

This application is a continuation of PCT Application No. PCT/JP2011/051343, filed Jan. 25, 2011, which is based upon and claims the benefit of priority from Japanese Patent Application No. 2010-014254 filed on Jan. 26, 2010. The contents of those applications are incorporated herein by reference in its entirety.

What is claimed is:

1. A colored glass plate made of alkali-containing silica glass comprising elements of iron, tin and sulfur, wherein the percentage of the total sulfur calculated as $SO_3$ is 0.025-0.065% as represented by mass percentage based on oxides, the percentage of divalent iron calculated as $Fe_2O_3$ in the total iron calculated as $Fe_2O_3$ is from 60 to 80% as represented by mass percentage, the content of $Na_2O$ is at least 0.5% as represented by mass percentage based on oxides, and the percentage of divalent tin calculated as $SnO_2$ in the total tin calculated as $SnO_2$ is at least 0.1% as represented by mol percentage, and wherein said colored glass plate is produced by a float process.

2. The colored glass plate according to claim 1, which has an absorption coefficient of at most $1.00\ cm^{-1}$ at a wavelength of 380 nm.

3. The colored glass plate according to claim 1, wherein the percentage of divalent tin calculated as $SnO_2$ in the total tin calculated as $SnO_2$ is at least 3% and at most 40% as represented by mol percentage.

4. The colored glass plate according to claim 1, which comprises, as represented by mass percentage based on the following oxides:

$SiO_2$: from 30 to 80%,
$Al_2O_3$: from 0 to 30%,
$B_2O_3$: from 0 to 20%,
MgO: from 0 to 30%,
CaO: from 0 to 30%,
$Na_2O$: from 0.5 to 50%,
$K_2O$: From 0 to 50%,
Total iron calculated as $Fe_2O_3$: from 0.001 to 5%,
Total tin calculated as $SnO_2$ : from 0.001 to 5%.

5. The colored glass plate according to claim 1, which comprises, as represented by mass percentage based on the following oxide:

Total sulfur calculated as $SO_3$: from 0.055 to 0.065%.

6. The colored glass plate according to claim 1, wherein the content of $Na_2O$ is from 1 to 30% as represented by mass percentage based on oxides.

7. The colored glass plate according to claim 1, wherein the Te value of the colored glass plate is at most 50%.

8. The colored glass plate according to claim 1, wherein the Sn-Redox of the colored glass plate is 0.1 to 50%.

* * * * *